(12) United States Patent
Calman et al.

(10) Patent No.: US 8,438,110 B2
(45) Date of Patent: May 7, 2013

(54) CONDUCTING FINANCIAL TRANSACTIONS BASED ON IDENTIFICATION OF INDIVIDUALS IN AN AUGMENTED REALITY ENVIRONMENT

(75) Inventors: Matthew A. Calman, Charlotte, NC (US); Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/342,069

(22) Filed: Jan. 1, 2012

(65) Prior Publication Data

US 2012/0233072 A1    Sep. 13, 2012

Related U.S. Application Data

(60) Provisional application No. 61/450,213, filed on Mar. 8, 2011, provisional application No. 61/508,764, filed on Jul. 18, 2011.

(51) Int. Cl.
*G06Q 40/99* (2006.01)

(52) U.S. Cl.
USPC ............................................. 705/44; 705/30

(58) Field of Classification Search ............... 705/10–44
See application file for complete search history.

(56) References Cited

U.S. PATENT DOCUMENTS

| | | | |
|---|---|---|---|
| 6,202,055 B1* | 3/2001 | Houvener et al. | 705/44 |
| 6,522,772 B1* | 2/2003 | Morrison et al. | 382/124 |
| 6,533,392 B1* | 3/2003 | Koitabashi | 347/43 |
| 6,856,965 B1* | 2/2005 | Stinson et al. | 705/21 |
| 7,016,532 B2 | 3/2006 | Boncyk et al. | |
| 7,062,454 B1* | 6/2006 | Giannini et al. | 705/26.81 |
| 7,110,964 B2* | 9/2006 | Tengler et al. | 705/21 |
| 7,154,529 B2* | 12/2006 | Hoke et al. | 348/77 |
| 7,403,652 B2 | 7/2008 | Boncyk et al. | |
| 7,412,081 B2 | 8/2008 | Doi | |
| 7,424,303 B2 | 9/2008 | Al-Sarawi | |
| 7,477,780 B2 | 1/2009 | Boncyk et al. | |
| 7,564,469 B2 | 7/2009 | Cohen | |
| 7,565,008 B2 | 7/2009 | Boncyk et al. | |
| 7,634,448 B1* | 12/2009 | Ramachandran | 705/79 |
| 7,680,324 B2 | 3/2010 | Boncyk et al. | |
| 7,735,728 B2* | 6/2010 | Wallerstorfer | 235/382 |
| 7,775,437 B2 | 8/2010 | Cohen | |

(Continued)

OTHER PUBLICATIONS

ISA/US, Commissioner for Patents, International Search Report and Written Opinion of International Searching Authority for International Application No. PCT/US12/28036 dated Jun. 4, 2012.

(Continued)

*Primary Examiner* — Frantzy Poinvil
(74) *Attorney, Agent, or Firm* — Michael A. Springs; Moore & Van Allen PLLC; Andrew D. Gerschutz

(57) ABSTRACT

Embodiments of the invention are directed to methods and apparatuses for conducting financial transactions based on identification of individuals in an augmented reality environment. The method includes capturing a video stream using a mobile computing device; analyzing, using a computing device processor, the video stream to distinguish between individuals and objects; identifying an individual in the video stream; authenticating the identity of the individual; and conducting the transaction after the individual is authenticated. The method may also include presenting indicators associated with the user, the identified individual, or the financial transaction.

22 Claims, 7 Drawing Sheets

U.S. PATENT DOCUMENTS

| | | |
|---|---|---|
| 7,792,738 B2 | 9/2010 | Channell |
| 7,881,529 B2 | 2/2011 | Boncyk et al. |
| 7,899,243 B2 | 3/2011 | Boncyk et al. |
| 7,899,252 B2 | 3/2011 | Boncyk et al. |
| 7,988,060 B2 * | 8/2011 | Killian et al. ............ 235/492 |
| 8,121,944 B2 * | 2/2012 | Norman et al. ............ 705/40 |
| 8,233,673 B2 * | 7/2012 | Britz et al. ............ 382/117 |
| 2003/0064705 A1 | 4/2003 | Desiderio |
| 2004/0021584 A1 | 2/2004 | Hartz et al. |
| 2004/0024709 A1 | 2/2004 | Yu et al. |
| 2006/0100951 A1 | 5/2006 | Mylet et al. |
| 2007/0140595 A1 | 6/2007 | Taylor et al. |
| 2008/0040278 A1 | 2/2008 | Dewitt |
| 2008/0214210 A1 | 9/2008 | Rasanen et al. |
| 2009/0094125 A1 | 4/2009 | Killian et al. |
| 2009/0102859 A1 | 4/2009 | Athsani et al. |
| 2009/0140839 A1 | 6/2009 | Bishop et al. |
| 2009/0144164 A1 | 6/2009 | Wane et al. |
| 2009/0171850 A1 | 7/2009 | Yuval |
| 2009/0182748 A1 | 7/2009 | Walker |
| 2009/0250515 A1 | 10/2009 | Todd et al. |
| 2010/0130226 A1 | 5/2010 | Arrasvuori et al. |
| 2010/0185529 A1 | 7/2010 | Chesnut et al. |
| 2011/0022540 A1 | 1/2011 | Stern et al. |
| 2011/0034176 A1 | 2/2011 | Lord et al. |
| 2011/0119155 A1 | 5/2011 | Hammad et al. |
| 2011/0202466 A1 | 8/2011 | Carter |

OTHER PUBLICATIONS

ISA/US Commissioner for Patents, PCT International Search Report and The Written Opinion of the International Searching Authority for International Application No. PCT/US12/48697 date of completion Sep. 24, 2012, date of mailing Oct. 12, 2012.

ISA/US, Commissioner for Patents, International Search Report and Written Opinion of International Searching Authority for International Application No. PCT/US2012/027912 dated Jun. 28, 2012.

ISA/US, Commissioner for Patents, International Search Report and Written Opinion of International Searching Authority for International Application No. PCT/US12/27892 dated Jun. 25, 2012.

ISA/US, Commissioner for Patents, International Search Report and Written Opinion of International Searching Authority for International Application No. PCT/US12/28008 dated Jun. 4, 2012.

* cited by examiner

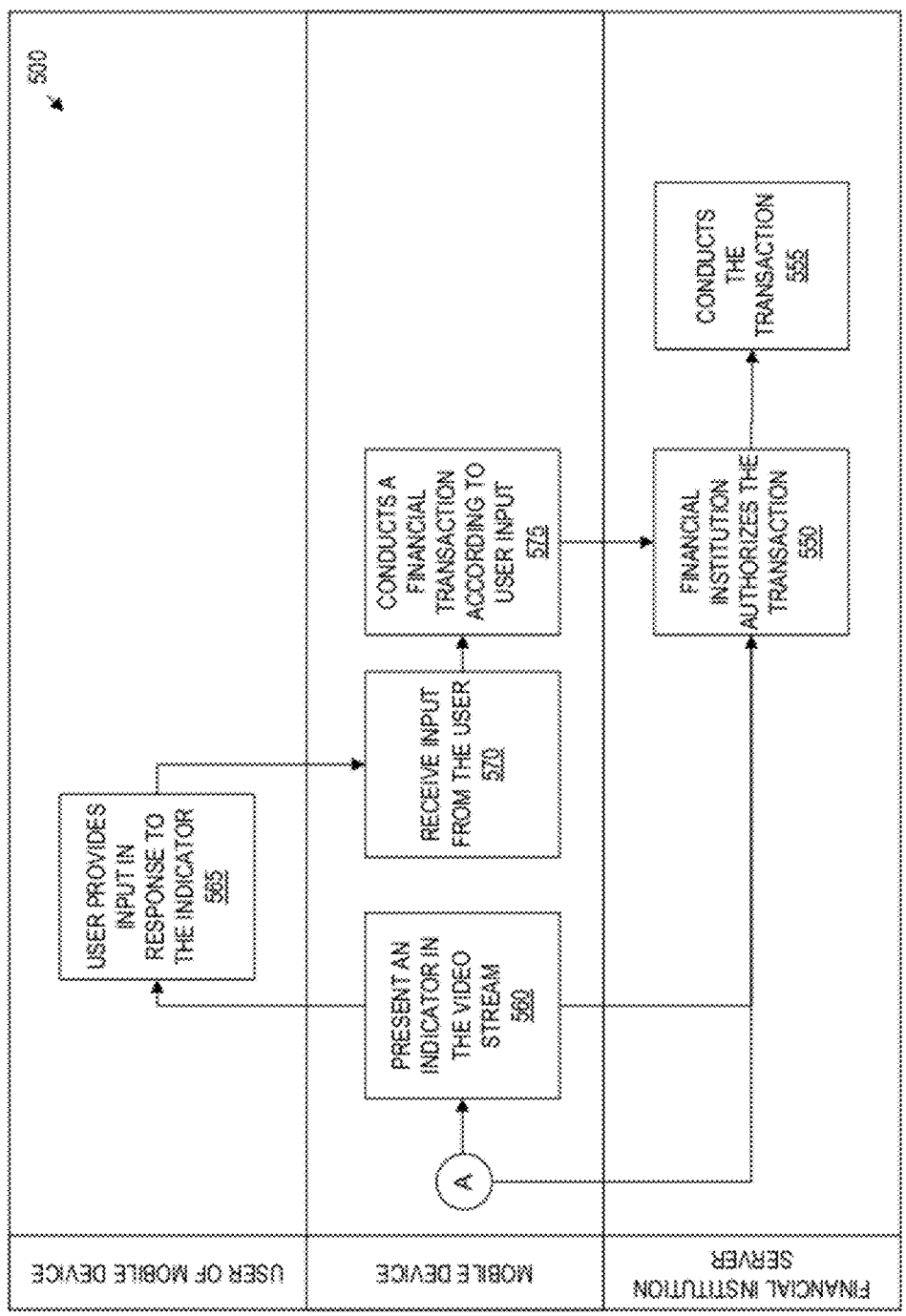

CONDUCTING FINANCIAL TRANSACTIONS BASED ON IDENTIFICATION OF INDIVIDUALS IN AN AUGMENTED REALITY ENVIRONMENT

CROSS-REFERENCE TO RELATED APPLICATIONS

This application claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/508,764, filed Jul. 18, 2011, entitled "Conducting Financial Transactions based on Identification of Individuals in an Augmented Reality Environment," the entirety of each of which is incorporated herein by reference.

BACKGROUND

Modern handheld mobile devices, such as smart phones and the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have additional features that are becoming increasingly more common as standardized features. Such features include, but are not limited to, location-determining devices, such as Global Positioning System (GPS) devices; sensor devices, such as accelerometers and touch pads; and high-resolution video cameras.

As the hardware capabilities of such mobile devices have increased, so to have the applications (i.e., software) that rely on the hardware advances. One such example of innovative software is a category known as augmented reality (AR), or more generally referred to as mediated reality. One such example of an AR presentation application platform is Layar, available from Layar, Amsterdam, the Netherlands.

The Layar platform technology analyzes real-time video data, location data, compass direction data and the like in combination with information related to the objects, locations or the like in the video stream to create browse-able "hot-spots" or "tags" that are superimposed on the mobile device display, resulting in an experience described as "reality browsing".

In many circumstances it may be useful to be able to conduct transactions based on identification of individuals. Presently, individuals are limited in their ability to authenticate the identity of other parties to transactions. Instead, individuals assume that a person at a store is an employee of the store or that a person is who they claim to be. Further, in many cases, it is inconvenient to authenticate an individual's identity based on written documentation, such as asking for identification. In addition, it may be useful to be able to authenticate one's own identity without having to enter passwords or other manual identification procedures. Passwords can be forgotten or stolen and hence may not be secure. Authenticating transactions using known methods is inconvenient, slow, and insecure because passwords can be forgotten, individuals can be deceptive about their identity, and authenticating objects such as driver's licenses or ID's can be lost.

Presently, one has to rely on memory and visual cues to identify individuals. Relying on memory and visual cues is limited by the person's memory and ability to perceive identifying features of an individual from a gathering of a number of people. Moreover, if one is trying to identify individuals who the person does not know, or identify individuals based on what the individual looked like many years ago, a person's memory and reliance on visual cues may be insufficient to identify the intended person. Furthermore, if a person is trying to identify individuals not based on familiarity with the individual but according to certain characteristics, such as national origin, demographic, appearance of health, intoxication, etc., a person may be limited in his ability to identify such individuals absent additional information or specialized training.

Therefore, a need exists to implement real-time video analysis, i.e., AR or the like, to assist the user of mobile devices with conducting financial transaction based on identification of individuals.

SUMMARY

The following presents a simplified summary of one or more embodiments of the present invention in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, apparatus systems and computer program products are described herein that provide for using real-time video analysis, such as AR or the like to assist the user of mobile devices with conducting financial transactions based on identification of individuals. Through the use of real-time image object recognition, facial features, facial symmetry, eye color, bone structure, hair color, hair style, body type, unique identifiers, clothing, locations and other features that can be recognized in a real-time video stream can be matched to images of individuals to assist the user with identifying one or more individuals. In specific embodiments, reference images provided made available to the system by the user or used to identify the individuals and authenticate their identity. In another embodiment disclosed here, the method utilizes financial institution data, which is uniquely specific to financial institutions, in providing information to mobile devices users in connection with real-time video stream analysis. These embodiments are exemplary.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

Some embodiments of the present invention provide a method wherein a mobile device is used to capture a real-time video stream. A processor analyzes the real-time video stream to distinguish which images present in the video stream are associated with individuals as opposed to objects. The processor then identifies the individuals based on comparison of the image in the real-time video stream with reference images. If the processor determines that the individual is identified within a desired confidence level, the processor authenticates the identity of the user and conducts the financial transactions. In some embodiments, the mobile device also presents indicators in the real-time video stream with one or more indicators associated with the user, the identified individual, or the financial transaction.

The user himself may be authenticated, allowing the mobile device to replace passwords when conducting transactions, or the user may authenticate the identity of other individuals, such as merchants or store employees. In some embodiments, the financial transaction is a purchase, sale, or transfer of funds (e.g., a gift or charitable donation, etc.). In some embodiments, information is presented in accordance with the transaction, such as the remaining balance in the account. Many types of indicators providing both information and potential actions can be presented in the user in accordance with some embodiments of the invention.

Consistent with certain embodiments of the invention, identifying an individual from the image captured in the real-time video stream involves collecting reference images that are available to the user and then comparing identifiable characteristics from the captured images with the reference images available to the user. If the comparison of the images suggests a match, additional information about the individual is identified.

In some embodiments, comparing identifiable characteristics from the captured images with the images available to the user involves modifying the images available to the user to adjust for changes that are likely to have occurred to the individual due to the passage of time.

In certain embodiments the images available to the user comprise images that are publicly available, images that are available from social networking sites of which the user is a member and images stored on an accessible memory source.

Embodiments of the invention also provide an apparatus where the apparatus has a device for capturing a real-time video stream, a processor configured to determine which images from the real-time video stream are associated with a person, and a display for presenting the real-time video stream with one or more indicators, each indicator being associated with the user, the identified individual, or the financial transaction. In further embodiments, the apparatus includes a position system device, wherein the individual is identified at least in part on a location of the individual determined by the positioning system device.

In some embodiments of the invention the processor is further configured to identify an individual from the image captured in the real-time video stream and compare the individual to reference images. In such embodiments the processor is also configured to correlate additional information collected to the individual identified in the real-time video stream. The apparatus may include a networking device for receiving reference images. The apparatus may also include a microphone for receiving an audio recording and identify the individual at least in part from the audio recording.

In some embodiments of the invention, in identifying an individual from the image captured in the real-time video stream the processor is also configured to collect images available to the user, compare identifiable characteristics from the captured images with the reference images available to the user and identify information about the individual if the comparison of the images suggests a match.

Embodiments of the invention also provide a computer program product comprising a non-transitory computer-readable medium having computer-executable code stored thereon. In one embodiment, the computer-executable code includes: a first code portion configured to capture, via a mobile device, a real-time video stream; a second code portion configured to analyze the real-time video stream to distinguish between individuals and objects; a third code portion configured to identify an individual in the real-time video stream; a fourth code portion configured to authenticate the individual in the real-time video stream; and a fifth code portion configured to conduct the financial transaction after the individual has been authenticated.

The computer program product may also include instructions for presenting information related to the individual, such as financial information (e.g., financial transactions between the user and the individual). The information may be presented in real-time. In further embodiments, the computer program product includes instructions for receiving input from the user, such as via a touch sensitive screen. The computer program product may also receive information from social networking sites, such as reference images of individuals associated with the user.

The features, functions, and advantages that have been discussed may be achieved independently in various embodiments of the present invention or may be combined with yet other embodiments, further details of which can be seen with reference to the following description and drawings

BRIEF DESCRIPTION OF THE DRAWINGS

Figure 1:
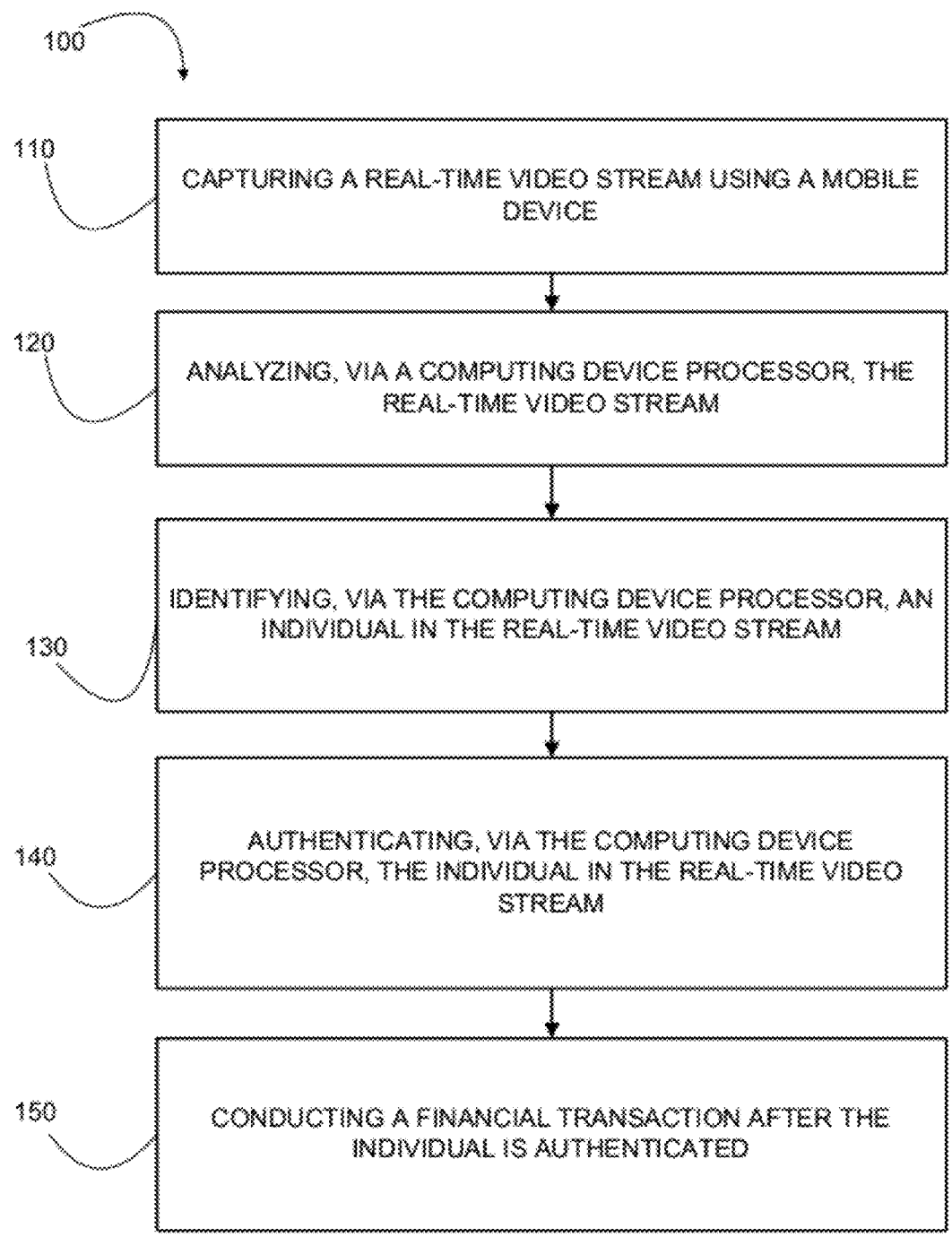

Having thus described embodiments of the invention in general terms, reference will now be made to the accompanying drawings, which are not necessarily drawn to scale, and wherein:

FIG. 1 is a flow diagram illustrating a process flow or an apparatus or system for conducting transaction based on identification of individuals in an augmented reality environment, in accordance with an embodiment of the invention.

Figure 2:
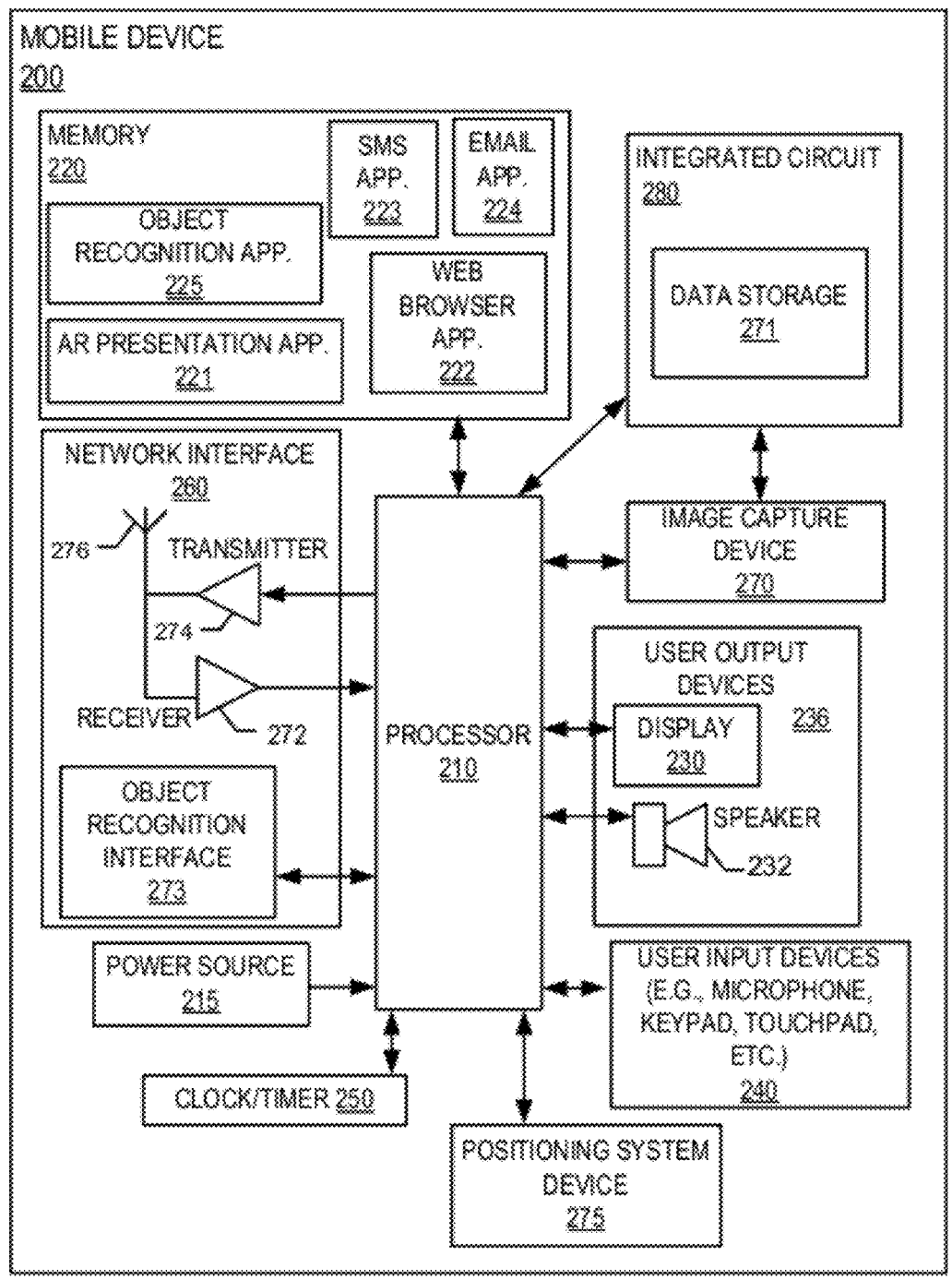
Figure 3:
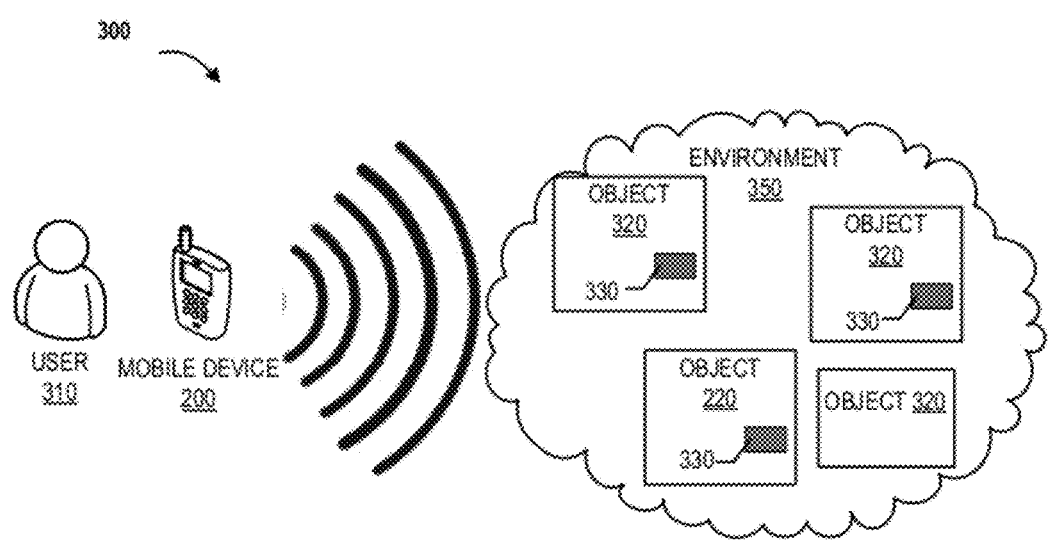
Figure 4:
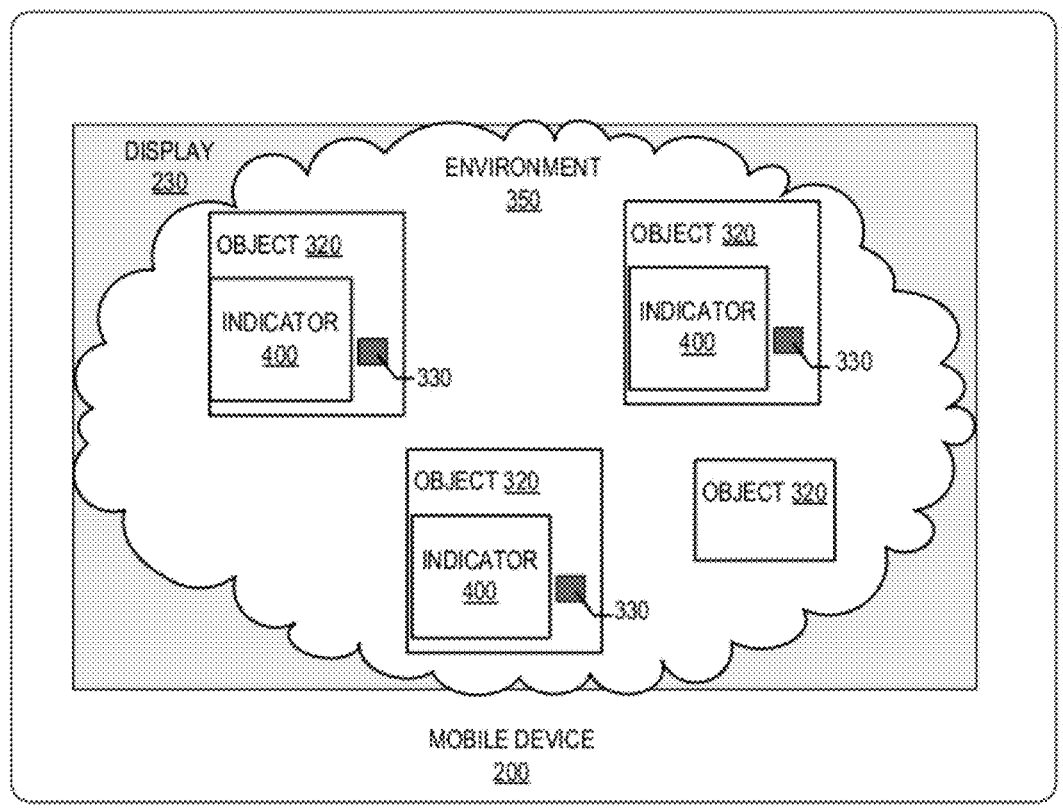
Figure 5A:
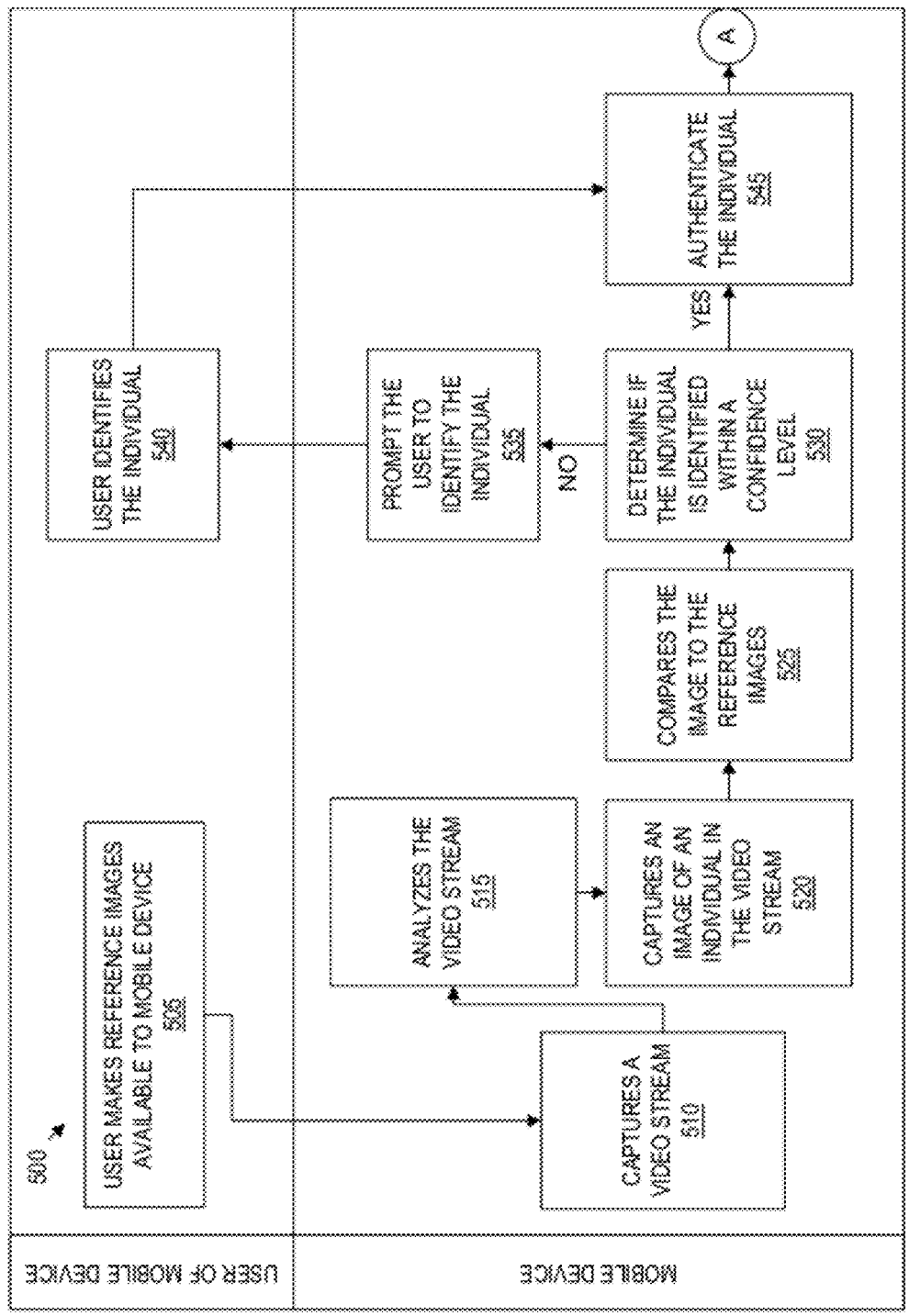
Figure 6:
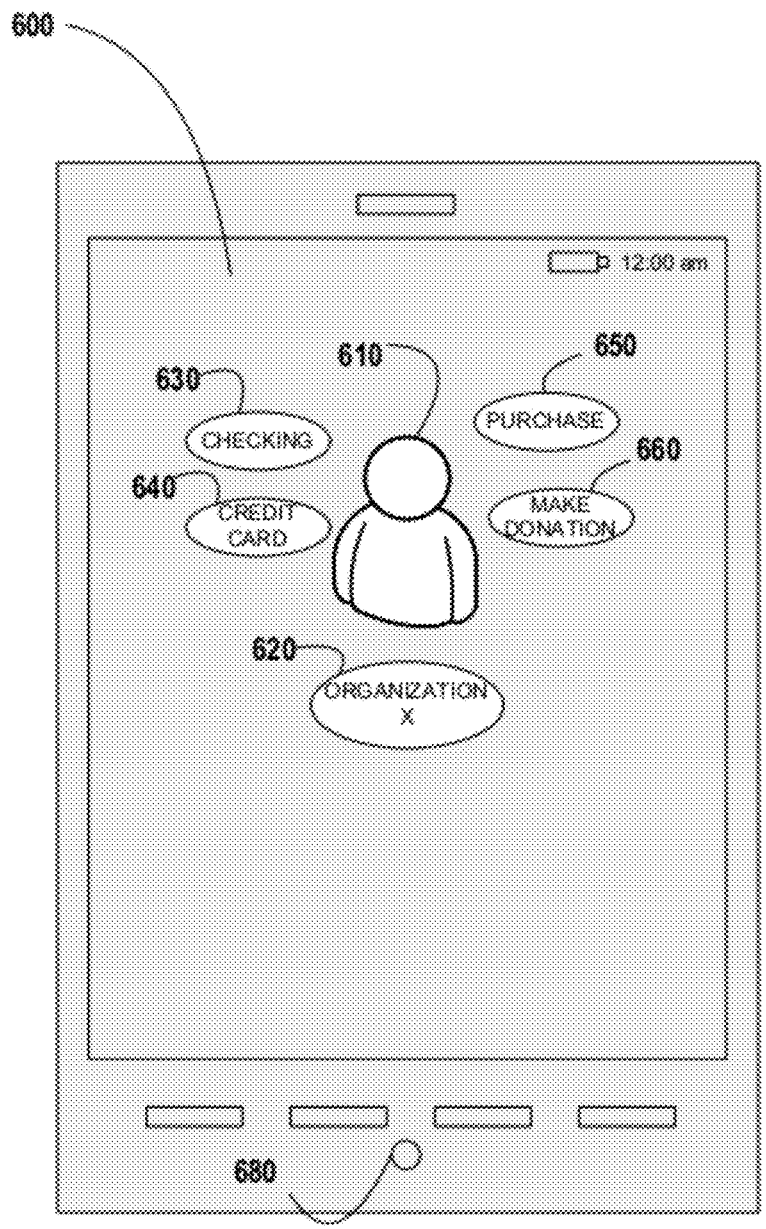

FIG. 2 is a block diagram illustrating a mobile device, in accordance with an embodiment of the invention;

FIG. 3 is a block diagram illustrating an AR environment, in accordance with an embodiment of the invention;

FIG. 4 is a block diagram illustrating a mobile device, in accordance with an embodiment of the invention;

FIGS. 5a and 5b are flow diagrams illustrating a process flow for an apparatus or system for conducting a financial transaction based on identification of an individual, in accordance with an embodiment of the invention; and FIG. 6 is a screen shot of a real-time video stream depicting identified individuals and indicators associated with those individuals, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, systems, computer programs and the like are herein disclosed that provide for using real-time video analysis, such as AR, to facilitate financial transactions based on identification of individuals in the augmented reality environment.

The methods, systems, computers programs and the like disclosed herein use real-time vision object recognition to identify facial features, facial symmetry, eye color, bone structure, hair color, hair style, body type, unique identifiers, clothing, locations, objects, text and other features that can be recognized in the real-time video stream and can be matched to data associated with specific individuals to identify individuals. Once the individual is identified and the individual's identity is authenticated, the financial transaction is conducted. In specific embodiments, images made available by the user will be compared images captured in the real-time video stream to identify a specific person or persons. In other embodiments, indicators relating to the financial transaction, the user, or the authenticated individual will be presented to the user in the real-time video stream. The indicators may merely provide information to the user or may allow the user to provide input in how to conduct the financial transaction.

While embodiments discussed herein are generally described with respect to "real-time video streams" or "real-time video" it will be appreciated that the video stream may be captured and stored for later viewing and analysis. Indeed, in some embodiments video is recorded and stored on a mobile device and portions or the entirety of the video may be analyzed at a later time. The later analysis may be conducted on the mobile device or loaded onto a different device for analysis. The portions of the video that may be stored and analyzed may range from a single frame of video (e.g., a screenshot) to the entirety of the video. Additionally, rather than video, the user may opt to take a still picture of the environment to be analyzed immediately or at a later time. Embodiments in which real-time video, recorded video or still pictures are analyzed are contemplated herein.

FIG. 1 illustrates a general process flow 100 of a computer-implemented method for conducting financial transactions based on identification of an individual in a real-time video stream in accordance with an embodiment of the invention. As represented by block 110 a mobile device is used to capture a real-time video stream. Then, as represented by block 120 a processor analyzes the real-time video stream to identify objects such as people and places in the real-time video stream. As represented by block 130, individuals in the real-time video stream are identified, e.g., by comparing captured images of the individuals to reference images. The identified individuals are authenticated by determining that the computer-implemented comparison is above a pre-determined confidence level or by confirmation from the user, as represented by block 140. Finally, after the individual is authenticated the financial transaction is conducted, as represented by block 150. Embodiments of the process 100, and systems and apparatus for performing the process 100, are described in greater detail below with reference to FIGS. 1-6.

FIG. 2 illustrates an embodiment of a mobile device 200 that may be configured to execute object recognition and Augmented Reality functionality, in accordance with specific embodiments of the present invention. A "mobile device" 200 may be any mobile communication device, such as a cellular telecommunications device (i.e., a cell phone or mobile phone), personal digital assistant (PDA), smartphone, a mobile Internet accessing device, or other mobile device including, but not limited to portable digital assistants (PDAs), pagers, mobile televisions, gaming devices, laptop computers, tablet computers, cameras, video recorders, audio/video players, radios, GPS devices, and any combination of the aforementioned, or the like.

The mobile device 200 may generally include a processor 210 communicably coupled to such devices as a memory 220, user output devices 236, user input devices 240, a network interface 260, a power source 215, a clock or other timer 250, an image capture device 270 (e.g., a camera), a positioning system device 275 (e.g., a Global Positioning System or GPS device), one or more integrated circuits 280, etc.

In some embodiments, the mobile device and/or the server access one or more databases or data stores (not shown in FIG. 2) to search for and/or retrieve information related to the object and/or marker. In some embodiments, the mobile device and/or the server access one or more data stores local to the mobile device and/or server and in other embodiments, the mobile device and/or server access data stores remote to the mobile device and/or server. In some embodiments, the mobile device and/or server access both a memory and/or data store local to the mobile device and/or server as well as a data store remote from the mobile device and/or server The processor 210, and other processors described herein, may generally include circuitry for implementing communication and/or logic functions of the mobile device 200. For example, the processor 210 may include a digital signal processor device, a microprocessor device, and various analog to digital converters, digital to analog converters, and/or other support circuits. Control and signal processing functions of the mobile device 200 may be allocated between these devices according to their respective capabilities. The processor 210 thus may also include the functionality to encode and interleave messages and data prior to modulation and transmission. The processor 210 may additionally include an internal data modem. Further, the processor 210 may include functionality to operate one or more software programs or applications, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like.

The processor 210 may also be capable of operating applications, such as an AR presentation application 221. The AR presentation application 221 may be downloaded from a server and stored in the memory 220 of the mobile device 200. Alternatively, the AR presentation application 221 may be pre-installed and stored in a memory in the integrated circuit 280 or operated directly from a website operably linked to the mobile device 200 through the network interface 260. In embodiments, where the AR presentation application 221 is pre-installed or run from a website, the user may not need to download the AR presentation application 221 from a server.

The memory 220 may also include an object recognition application 225 configured to identify objects in still shots or video. In an embodiment, the object recognition application 225 identifies diagnostic features of individuals or objects in the still shot or video and then compares the diagnostic features to a database of reference images using algorithms. The object recognition application 225 may be stored on the mobile device 200 or may communicate with a remote server via an object recognition interface 273 in association with the network interface 260. The object recognition application 225 may be downloaded from a server and stored in the memory 220 of the mobile device 200. Alternatively, the object recognition application 225 may be pre-installed and stored in a memory in an integrated circuit. In such an embodiment, the user may not need to download the object recognition application 225 from a server.

In some embodiments, the processor 210 may also be capable of operating one or more applications, such as one or more applications functioning as an artificial intelligence ("AI") engine. The processor 210 may recognize objects that it has identified in prior uses by way of the AI engine. In this way, the processor 210 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or server, an indication that the object may be the same object previously recognized. In this regard, the AI engine may provide a baseline or starting point from which to determine the nature of the object. In other embodiments, the AI engine's recognition of an object is accepted as the final recognition of the object.

The integrated circuit 280 may include the necessary circuitry to provide the object recognition and/or AR functionality to the mobile device 200. Generally, the integrated circuit 280 will include data storage 271 which may include data associated with the objects within a video stream that the object recognition application 225 and/or AR presentation application 221 identifies as having certain marker(s) (discussed in relation to FIG. 3). The integrated circuit 280 and/or data storage 271 may be an integrated circuit, a microprocessor, a system-on-a-chip, a microcontroller, or the like. As discussed above, in one embodiment, the integrated circuit 280 may provide the functionality to the mobile device 200.

Of note, while FIG. 2 illustrates the integrated circuit 280 as a separate and distinct element within the mobile device 200, it will be apparent to those skilled in the art that the object recognition functionality of the integrated circuit 280 may be incorporated within other elements in the mobile device 200. For instance, the functionality of the integrated circuit 280 may be incorporated within the mobile device memory 220 and/or the processor 210. In a particular embodiment, the functionality of the integrated circuit 280 is incorporated in an element within the mobile device 200 that provides object recognition capabilities to the mobile device 200. Moreover, the functionality may be part of the firmware of the mobile device 200. Still further, the integrated circuit 280 functionality may be included in a removable storage device such as an SD card or the like.

The processor 210 may be configured to use the network interface 260 to communicate with one or more other devices on a network. In this regard, the network interface 260 may include an antenna 276 operatively coupled to a transmitter 274 and a receiver 272 (together a "transceiver"). The processor 210 may be configured to provide signals to and receive signals from the transmitter 274 and receiver 272, respectively. The signals may include signaling information in accordance with the air interface standard of the applicable cellular system of the wireless telephone network that may be part of the network. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 200 may also be configured to operate in accordance with non-cellular communication mechanisms, such as via a wireless local area network (WLAN) or other communication/data networks.

The network interface 260 may also include an object recognition interface 273 in order to allow a user to execute some or all of the above-described processes with respect to the object recognition application 225 and/or the integrated circuit 280. The object recognition interface 273 may have access to the hardware, e.g., the transceiver, and software previously described with respect to the network interface 260. Furthermore, the object recognition interface 273 may have the ability to connect to and communicate with an external object-oriented data storage on a separate system within the network as means of recognizing the object(s) in the video stream.

As described above, the mobile device 200 may have a user interface that includes user output devices 236 and/or user input devices 240. The user output devices 236 may include a display 230 (e.g., a liquid crystal display (LCD) or the like) and a speaker 232 or other audio device, which are operatively coupled to the processor 210. The user input devices 240, which may allow the mobile device 200 to receive data from a user 310, may include any of a number of devices allowing the mobile device 200 to receive data from a user 310, such as a keypad, keyboard, touch-screen, touchpad, microphone, mouse, joystick, stylus, other pointer device, button, soft key, and/or other input device(s).

The mobile device 200 may further include a power source 215. Generally, the power source 215 is a device that supplies electrical energy to an electrical load. In one embodiment, power source 215 may convert a form of energy such as solar energy, chemical energy, mechanical energy, etc. to electrical energy. Generally, the power source 215 in the mobile device 200 may be a battery, such as a lithium battery, a nickel-metal hydride battery, or the like, that is used for powering various circuits, e.g., the transceiver circuit, and other devices that are used to operate the mobile device 200. Alternatively, the power source 215 may be a power adapter that can connect a power supply from a power outlet to the mobile device 200. In such embodiments, a power adapter may be classified as a power source "in" the mobile device.

The mobile device 200 may also include a memory 220 operatively coupled to the processor 210. As used herein, memory may include any computer readable medium configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory may additionally or alternatively include an electrically erasable programmable read-only memory (EEPROM), flash memory or the like.

The memory 220 may store any of a number of applications or programs which comprise computer-executable instructions/code executed by the processor 210 to implement the functions of the mobile device 200 described herein. For example, the memory 220 may include such applications as an object recognition application 225, an augment reality (AR) presentation application 221 (described infra in relation to FIG. 2), a web browser application 222, a Short Message Service (SMS) application 223, an electronic mail (i.e., email) application 224, etc.

Referring to FIG. 3, a block diagram illustrating an AR experience 300 in which a user 310 utilizes the mobile device 200 to capture a video stream that includes an environment 350 is shown. As denoted earlier, the mobile device 200 may be any mobile communication device. The mobile device 200 has the capability of capturing a video stream of the surrounding environment 350. The video capture may be by any means known in the art. In one particular embodiment, the mobile device 200 is a mobile telephone equipped with an image capture device 270 capable of video capture.

The environment 350 contains a number of objects 320. Some of such objects 320 may include a marker 330 identifiable to an object recognition application that is either executed on the mobile device 200 or within the wireless network. A marker 330 may be any type of marker that is a distinguishing feature that can be interpreted by the object recognition application to identify specific objects 320. For instance in identifying an individual, a marker may be facial features, facial symmetry, eye color, bone structure, hair color, hair style, body type, unique identifiers, shapes, ratio of size of one feature to another feature, skin color, height etc. In some embodiments, the marker 330 may be audio and the mobile device 200 may be capable of utilizing audio recognition to identify words or the unique qualities of an individual's voice. The marker 330 may be any size, shape, etc. Indeed, in some embodiments, the marker 330 may be very small relative to the object 320 such as a mole or birth mark on an individual's skin, whereas, in other embodiments, the marker 330 may be the entire object 320 such as the unique height and proportion of the individual.

The marker 330 may also be or include social network data, such as data retrieved or communicated from the Internet, such as tweets, blog posts, social networking site posts, various types of messages and/or the like. In other embodiments, the marker 330 is provided in addition to social network data as mentioned above. For example, the mobile device 200 may capture a video stream and/or one or more still shots including a large group of people. In one example, a person dressed as a popular character of a show and multiple people dressed as other characters of the show may be present. The mobile device 200 may identify several social network indicators, such as posts, blogs, tweets, messages, and/or the like indicating the presence of the popular character in the group. In this way, the mobile device 200 may communicate information regarding the social media communications to the user and/or use the information regarding the social media communications in conjunction with other methods of object recognition. For example, the mobile device and/or server performing recognition of the popular character may confirm that the object being identified is the popular character based on retrieved social media communications.

In some embodiments, the mobile device and/or server accesses one or more other servers, social media networks, applications and/or the like in order to retrieve and/or search for information useful in performing object recognition. In some embodiments, the mobile device and/or server accesses another application by way of an application programming interface or API. In this regard, the mobile device and/or server may quickly search and/or retrieve information from the other program without requiring additional authentication steps or other gateway steps.

In some embodiments, the mobile device 200 and/or the server access one or more databases or datastores (not shown) to search for and/or retrieve information related to the object and/or marker. In some embodiments, the mobile device 200 and/or the server access one or more datastores local to the mobile device 200 and/or server and in other embodiments, the mobile device 200 and/or server access datastores remote to the mobile device and/or server. In some embodiments, the mobile device 200 and/or server access both a memory and/or datastore local to the mobile device 200 and/or server as well as a datastore remote from the mobile device 200 and/or server In another embodiment, the marker 330 is a biometric marker associated with an individual. For example, the biometric marker may be based on an iris scan, palm print, fingerprint, or other type of biometric marker. In one embodiment, the biometric marker is the user's own biometric marker and the user authenticates his identity using the computer-implemented system and method. In another embodiment, the biometric mark is another individual's biometric marker. Other individuals' biometric markers may be made available to the computer-implemented method by individual uploading said markers to a financial institution database, a social networking site, or other publicly available location. For example, small business owners may want to make it easy for customers to pay them and therefore upload their biometric markers to a public financial institution database.

In some embodiments, the marker 330 is not actually a physical feature associated with the individual. For instance, the marker 330 may be some type of identifiable feature, such as objects, logos, artwork, products, text, locations and other features that indicate that the object 320 is nearby. In some embodiments, the marker 330 is an action or gesture performed by an individual. For example, an individual may make a hand signal to identify himself. Use of hand signals or other gestures allows individuals to silently identify themselves or identify themselves in noisy situations. In some embodiments, the marker 330 for an object 320 may actually be the marker 330 for a different object 320. For example, the mobile device 200 may recognize a particular building as being "Building A." Data stored in the object recognition data storage may indicate that "Building B" is located directly to the east and next to "Building A." Thus, markers 330 for an object 320 that are not located on or being broadcast by the object 320 are generally based on fixed facts about the object 320 (e.g., "Building B" is next to "Building A"). However, it is not a requirement that such a marker 330 be such a fixed fact. The marker 330 may be anything that enables the mobile device 200 to interpret to a desired confidence level what the object is. For example, the mobile device 200 may capture a series of numbers on the façade of a building, collect the user's position using the positioning system device 275 and correlate that position and the numbers to being at a specific residential address owned by an individual stored in the user's address book in the memory 220 of the mobile device 200. The mobile device 200 may then use the web browser application 222 and network interface 260 to access the individual's profile on a social network through which the individual and the user are connected and determine that the individual is single and living away from his hometown and conclude that the person who answers the door at this address is the same individual. Accordingly, the markers 330 associated with the individual's house and other available information were sufficient to identify the individual without relying on the markers 330 of the individual.

While FIG. 3 illustrates that the objects 320 with markers 330 only include a single marker 330, it will be appreciated that the object 320 may have any number of markers 330 with each equally capable of identifying the object 320. Similarly, multiple markers 330 may be identified by the mobile device 200 such that the combination of the markers 330 may be utilized to identify the object 320. For example, consider a situation where the mobile device 200 is confronted with identical twins and the mobile device 200 utilizes facial recognition markers 330 to identify the individuals as being the twins and utilizes a separate marker 330 such as a wedding ring, glasses, a tattoo etc. to correctly differentiate between the twins.

In some embodiments, a marker 330 may be the location of the object 320. In such embodiments, the mobile device 200 may utilize Global Positioning System (GPS) hardware and/or software or some other location-determining mechanism to determine the location of the user 310 and/or the object 320. As noted above, a location-based marker 330 could be utilized in conjunction with other non-location-based markers 330 and recognized by the mobile device 200 to identify the object 320. However, in some embodiments, a location-based marker 330 may be the only marker 330. For instance, in such embodiments, the mobile device 200 may utilize GPS software to determine the location of the user 310 and a compass device or software to determine what direction the mobile device 200 is facing in order to identify the object 320. In still further embodiments, the mobile device 200 does not utilize any GPS data in the identification. In such embodiments, markers 330 utilized to identify the object 320 are not location-based.

FIG. 4 illustrates the mobile device 200, specifically the display 230 of the mobile device 200, wherein the device 200 has executed an object recognition application 225 and an AR presentation application 221 to present within the display 230 indications of recognized objects within the video stream (i.e., surrounding environment 350). The mobile device 200 is configured to rely on markers 330 to identify objects 320, for example individuals from the user's business, and indicate to the user 310 the identified objects 320 by displaying a indicator 400 on the mobile device display 230 in conjunction with display of the video stream. As illustrated, if an object 320 does not have any markers 330 (or at least enough markers 330 to yield object identification), the object 320 will be displayed without an associated indicator 400.

The object recognition application 225 may use any type of means in order to identify desired objects 320. For instance, the object recognition application 225 may utilize one or more pattern recognition algorithms to analyze objects in the environment 350 and compare with markers 330 in data storage which may be contained within the mobile device 200 (such as within integrated circuit 280) or externally on a separate system accessible via the connected network. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

Upon identifying an object 320 within the video stream, in some embodiments the AR presentation application 221 is configured to superimpose an indicator 400 on the mobile device display 230. In an embodiment, the indicator 400 is generally a graphical representation that highlights or outlines the object 320 and may be activatable (i.e., include an embedded link), such that the user 310 may "select" the indicator 400 and retrieve information related to the identified object. The indicator 400 may be a tab or link displayed such that the user 310 may "select" the indicator 400. In embodiments in which the indicator 400 provides an interactive tab to the user 310, the user 310 may select the indicator 400 by any conventional means, e.g., keystroke, touch, voice command, iris tracking, or the like, for interaction with the mobile device 200. For instance, in some embodiments, the user 310 may utilize an input device 240 such as a keyboard to highlight and select the indicator 400 in order to retrieve the information. In a particular embodiment, the mobile device display 230 includes a touch screen that the user may employ to select the indicator 400 utilizing the user's finger, a stylus, or the like. In yet other embodiments, the indicator information related to the identified object may be visualized by the user 310 without "selecting" the indicator 400. In some embodiments, the indicator 400 is not interactive and simply provides information to the user by superimposing the indicator 400 on the display 230. For example, in some instances it may be beneficial for the AR presentation application 221 to merely identify an object 320, e.g., just identify the object's name/title, give brief information about the object, etc., rather than provide extensive detail that requires interaction with the indicator 400. The AR presentation application 221 is capable of being tailored to a user's desired preferences.

Furthermore, the indicator 400 may be displayed at any size on the mobile device display 230. The indicator 400 may be small enough that it is positioned on or next to the object 320 being identified such that the object 320 remains discernable behind the indicator 400. Additionally, the indicator 400 may be semi-transparent or an outline of the object 320, such that the object 320 remains discernable behind or enclosed by the indicator. In other embodiments, the indicator 400 may be large enough to completely cover the object 320 portrayed on the display 230. Indeed, in some embodiments, the indicator 400 may cover a majority or the entirety of the mobile device display 230.

The user 310 may opt to execute the object recognition application 225 or the AR presentation application 221 at any desired moment and begin video capture and analysis. However, in some embodiments, the object recognition application and/or AR presentation application 221 includes an "always on" feature in which the mobile device 200 is continuously capturing video and analyzing the objects 320 within the video stream. In such embodiments, the AR presentation application 221 may be configured to alert the user 310 that a particular object 320 has been identified. The user 310 may set any number of user preferences to tailor the AR experience 300 to their needs. For instance, the user 310 may opt to only be alerted if a certain particular object 320 is identified. Additionally, it will be appreciated that the "always on" feature in which video is continuously captured may consume the mobile device power source 215 more quickly. Thus, in some embodiments, the "always on" feature may disengage if a determined event occurs such as low power source 215, low levels of light for an extended period of time (e.g., such as if the mobile device 200 is in a user's pocket obstructing a clear view of the environment 350 from the mobile device 200), if the mobile device 200 remains stationary (thus receiving the same video stream) for an extended period of time, the user sets a certain time of day to disengage, etc. Conversely, if the "always on" feature is disengaged due to the occurrence of such an event, the user 310 may opt for the "always on" feature to re-engage after the duration of the disengaging event (e.g., power source 215 is re-charged, light levels are increased, etc.).

The indicator 400 may relate to the identified object, i.e., the identified individual. In another embodiment, the indicator 400 relates to the user of the mobile device or to the financial transaction that is being conducted. In an embodiment, the indicator 400 provides information to the user. The information may include any desired information associated with the selected object and may range from basic information to greatly detailed information. In some embodiments, the indicator 400 may provide the user 310 with an internet hyperlink to further information on the object 320. The information may include, for example, all types of media, such as text, images, clipart, video clips, movies, or any other type of information desired. In a still further embodiment, the indicator 400 presents options to the user for controlling the financial transaction. For example, the indicator 400 may include a depiction of each bank account of the user 310 and allow the user 310 to select the account through which the financial transaction will occur. The indicator 400 may also display various actions that can be taken regarding the transaction, such as making a purchase, making a return, making a sale, making a loan, making a gift, making a charitable contribution, deposit money in an account, transfer funds, etc., all of which will be discussed in greater detail in blocks 560-575.

In some embodiments, selecting the indicator 400 will cause the AR presentation application 221 to conduct a transaction, such as a gift, flowers, a service, etc. associated with the individual represented as an object associated with the indicator. In some instances, the order functionality may be a part of the AR presentation application 221. In other embodiments, the AR presentation application may access the user's accounts associated with a financial institution enabling the user 310 to purchase an item associated with the object 320 without having to input data such as a credit card number of billing address. In other embodiments, when the user 310 selects the indicator 400 to purchase the product, the AR presentation application 221 will activate the web browser application 222 to allow the user to purchase the product over the Internet from a website.

In some embodiments, selecting the indicator 400 will cause the computer-implemented method to send a coupon or advertisement to the individual. For example, a merchant may use the computer-implemented method to identify her customers and then send discount coupons for a particular product or retailer to them. In another embodiment, selecting the indicator 400 allows the user to send reviews to the person selected. In one embodiment, the user is able to immediately write reviews and then send them to the individual. For example, a user may use the computer-implemented system and method to identify an employee of a business and then write a review of that employee's service to the business. In a still further embodiment, the user is able to identify individuals using the computer-implemented system and method and then send gifts, gift cards, or make charitable donations in the individuals name after positively identifying the individual. Other embodiments of actions that may be taken after identifying individuals will be discussed in FIGS. 5a and 5b.

In yet other embodiments, the AR presentation application 221 may be provided with a wish list defined by automatic acceptance of items or actions on the wish list when the items are recognized into the real-time video stream. In some embodiments, specific predefined rules are defined in a rules engine such that when an item on the wish list is identified in the real-time video stream and the offer for the item matches the predefined rules the AR presentation application 221 will execute the purchase of and payment for the product, on behalf of the user 202. For example, a user may set up a wish list that instructs the computer-implemented method to purchase a specific item if the item is on sale for less than twenty dollars. When that item is identified in the real-time video stream and the price of the item is less than twenty dollars, the item will automatically be purchased. Similarly, a wish list action may be set up such that when an individual is identified in a real-time video stream, a transaction is automatically conducted with that individual. For example, if a user owes an individual one hundred dollars, the user can set up a rule using the computer-implemented method that instructs the method to automatically transfer one hundred dollars to the individual when the individual is identified. This functionality allows the user to ensure that the debt is paid when the user next meets the person.

In some embodiments, the indicator 400 is not interactive and simply provides information to the user 310 by superimposing the indicator 400 onto the display 230. For example, in some instances it may be beneficial for the AR presentation application 221 to merely identify an object 320, providing the object's name and giving brief information about the object, such as name of the business, loan balance from the business, etc., rather than provide extensive detail that requires interaction with the indicator 400. The mobile device 200 is capable of being tailored to a user's desired preferences.

In some embodiments, the user 310 may identify objects 320 that the object recognition application 225 does not identify and add the objects to the data storage 271 with desired information in order to be identified and/or displayed in the future. For instance, the user 310 may select an unidentified object 320 and enter the individual's name and/or any other desired information for the unidentified object 320. For instance, if the user 310 encounters an individual at a merchant that she would like the object recognition application 225 to recall in a future video capture, the user 310 may record a video of the individual or capture a still picture of the individual and assign a indicator 400 to the individual. In such embodiments, object recognition application 225 may detect/record certain markers 330 (i.e. facial features, bone structure etc.) about the object so that the pattern recognition algorithm(s) (or other identification means) may detect the object 320 in the future. Furthermore, in cases where the object information is within the data storage 271, but the object recognition application 225 fails to identify the object 320 (e.g., one or more identifying characteristics or markers 330 of the object has changed since it was added to the data storage 271 or the marker 330 simply was not identified), the user 310 may select the object 320 and associate it with an object 320 already stored in the data storage 271. In such cases, the object recognition application 225 may be capable of updating the markers 330 (e.g., changes to hair style, hair color, new tattoos etc.) for the object 320 in order to identify the object in future video streams.

In some embodiments, the processor 210 may also be capable of operating one or more applications, such as one or more applications functioning as an artificial intelligence ("AI") engine. The processor 210 may recognize objects that it has identified in prior uses by way of the AI engine. In this way, the processor 210 may recognize specific objects and/or classes of objects, and store information related to the recognized objects in one or more memories and/or databases discussed herein. In some embodiments, an individual that is identified from a single frame in a real-time video stream may contribute to the AI functionality using other frames in the video stream. Improvements may include multiple reference images available to the system and method, such as an individual with and without facial hair or from different angles; information on which social networks to search first when evaluating an individual, perhaps based on location or other individuals identified in the same frame; or distinguishing features between individuals, such as means for distinguishing between brothers. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or server, an indication that the object may be the same object previously recognized. In this regard, the AI engine may provide a baseline or starting point from which to determine the nature of the object. In other embodiments, the AI engine's recognition of an object is accepted as the final recognition of the object.

In addition, in some embodiments, the user 310 may opt to edit the information or add to the information provided by the indicator 400. For instance, the user 310 may opt to include user-specific information about a certain object 320 such that the information may be displayed upon a future identification of the object 320. For instance, the user 310 may associate a phone number, business references, the place the user and the individual met etc. Conversely, in some embodiments, the user may opt to delete or hide an object 320 from being identified and an indicator 400 associated therewith being displayed on the mobile device display 230. For instance, if an individual is one that is well known to the user 310, the user 310 may hide the object 320 associated with the individual so as not to crowd the display 230.

FIGS. 5a and 5b illustrate a flow diagram of a process flow for a computer-implemented method 500 for conducting financial transactions based on identification of an individual, in accordance with embodiments of the invention. In FIGS. 5a and 5b, in some embodiments steps in the computer-implemented method 500 are performed by the mobile device, the user of the mobile device, and/or the financial institution server. The computer-implemented method 500 allows the user to capture an image of an individual in a real-time video stream, identify the individual based on a reference image, authenticate the identity of the individual, and conduct transactions after the individual is authenticated. In one embodiment, the individual being identified is the user of the mobile device. In another embodiment, the individual being identified is someone other than the user of the mobile device, e.g., a merchant, a lender, a recipient of funds, etc.

In block 505, the user makes reference images available to the mobile device. A reference image is an image associated with an individual. In an embodiment, the user confirms that the reference image is of the individual. The user may upload a file of contacts including names and images of the contacts, or the user may take a picture of an individual using the mobile device and then tag the photograph with the individual's name. In another embodiment, the reference image is associated with the individual through publicly or privately available information. For example, the computer-implemented method 500 may collect reference images from the user's social networking sites or a financial institution may include a private database of small business owner reference images. When the reference image is associated with the individual, the computer-implemented method 500 confirms to a desired level that the image is of the individual. The computer-implemented method 500 may evaluate numerous images on a social networking site profile to confirm that an image is of the person operating the profile. The computer-implemented method 500 may confirm the image by comparing images secured from various locales, e.g., a comparison of an image gathered from a work-related website and an image gathered from an online dating site. In an embodiment, the user makes the reference images available to the mobile device by saving the images to the mobile device, entering log-in information associated with social networking sites, connecting the mobile device to public or private networks, or any other means known to one skilled in the art.

In an exemplary embodiment, the reference images are encrypted. While the reference images may be available to the computer-implemented system and method, the reference images are protected from public display so that, should the mobile device be lost, the reference images and associated identifying characteristics are not available. Encryption maintains the security of the system and prevents confidential or sensitive information relating to individuals from being made public.

In block 510, the computer-implemented method 500 captures a real-time video stream. As discussed previously, the computer-implemented method is discussed with respect to real-time video streams but recorded video streams or still images can also be used to identify individuals and conduct transactions. In an exemplary embodiment, the user operates a mobile device to capture the real-time video stream in a camera cable of recording video. The video may be displayed concurrently in a display on the mobile device or the video may be streamed to another device for display. In another embodiment, the real-time video stream is always on, or on until the battery reaches a pre-determined level.

In block 515, the computer-implemented method 500 analyzes the real-time video stream. In some embodiments, the method distinguishes between people and objects during the analysis of the real-time video stream. The method may distinguish people based on analysis of faces. For example, the method may conduct a proximity analysis of features, such as eyes, to determine that a part of the real-time video stream is depicting a person. Other distinguishing features may also be used to separate individuals from other objects in the real-time video stream. The method may also analyze the real-time video stream to identify the location of the video, the time of the video, or other distinguishing characteristics of the real-time video stream. As discussed previously, these distinguishing features may be used to assist the computer-implemented method in identifying the individual or individuals in the real-time video stream.

In some embodiments (not shown), the computer-implemented method analyzes still photographs or images of individuals available to the user, rather than analyzing a real-time video stream. The computer-implemented method may review the images stored on the user's mobile device or available over a network, such as available through the financial institution or through social networking sites. In an embodiment, the computer-implemented method analyzes the still photograph or image to identify individuals in the same manner as described herein for real-time video streams. Once the computer-implemented method identifies an individual from the still photograph or image, the computer-implemented method is capable of conducting a transaction based on the identification. In this manner, the computer-implemented method is able to conduct transactions even when the individual depicted in the image is not immediately available. In an exemplary embodiment, the computer-implemented method analyzes a still photograph, identifies an individual within the photograph, provides information relating to that individual or the proposed transaction, and conducts the transaction. The type of information that can be presented to the user include the number of transactions between the user and the identified individual, the total amount transferred, the remaining balance after the proposed transfer, the debt still owed the individual, or other types of relational or transactional data. In some embodiments, the information can be supplemented by the user. For example, the user may enter the total amount of a loan from an individual into the computer-implemented method. As the user pays off the loan to the individual, the balance on the loan decreases and the balance is displayed as supplemental information in association with the individual's image.

In block 520, the computer-implemented method 500 captures an image of an individual in the real-time video stream. In an embodiment, after analyzing the real-time video stream to distinguish individuals from other objects in the real-time video stream the computer-implemented method 500 captures an image of an individual in the real-time video stream. The image may be extracted from the real-time video stream or isolated in the real-time video stream so that analysis can be performed the image. In an embodiment, the computer-implemented method captures an image of an individual in a frontal or facial view to assist in identifying the individual.

In block 525, the computer-implemented method 500 compares the image to the reference images. The computer-implemented method 500 may use any type of means in order to compare the image to the reference images. For instance, the computer-implemented method 500 may utilize one or more pattern recognition algorithms to analyze features in image and compare with markers in the reference images which may be contained within the mobile device 200 (such as within integrated circuit 280) or externally on a separate system accessible via the connected network. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

In block 530, the computer-implemented method 500 determines if the individual is identified within a desired confidence level. The desired confidence level may be a pre-determined or desired statistical confidence level that is calculated by the pattern recognition algorithm. The desired confidence level may be set by the user, by individuals, or by financial institutions. The pre-determined confidence level may be with 99% confidence, 95% confidence, 90% confidence, or any level of confidence desired by the user, an individual being identified, or a financial institution. For example, a small business owner may upload a reference image to a financial institution server and allow individuals to pay the small business owner using the method described herein. The small business owner may desire that she is identified with a certain level of confidence, such as 95%, before allowing the method to transfer funds to her business.

In an embodiment, different confidence levels are established before different actions may be taken by the computer-implemented method. For example, a financial institution may determine that a low confidence in the identification will allow the computer-implemented method 500 to display recent transaction with the individual in the real-time video stream. Providing information such as recent transactions, the balance in accounts, the name of a business, etc., does not risk conducting an erroneous transaction based on a false identification. If, however, the transaction that will be conducted involves transferring funds then the financial institution may determine that a higher confidence level is advisable. The financial institution may determine that to buy or sell an item using the computer-implemented method 500, or to transfer money to an individual or business as a loan or gift, the confidence level in the identification must be higher than 95%, for example. In another embodiment, a low confidence level in the identification combined with a second factor confirms the individual's identity and allows the transaction to proceed. For example, the system and method may identify an individual with only 60% confidence based on the comparison of the image in the real-time video stream with a reference image but when that identification is combined with a second factor, such as a password, a location, or a customer history record, the transaction is allowed. A customer history record may mean that the user transfers money to the same individual the first of every month or transfers money to the same individual at the same location every time.

In some embodiments, the system and method may use information stored with the image to create challenge questions that can be sent to the user to aid in authentication. For example, social media data gathered may include various facts about the individual that could be used to ask challenge questions of the individual. Certain features about the person, such as age, height, weight, and/or other bodily features may be provided to the user so that they may visually verify the person. For example, an online profile may indicate that an individual is six feet four inches tall. To confirm the individual's identity, the computer-implemented method may ask the user if the individual is over six feet tall. An indicator may allow the user to respond yes or no and narrow down the possible identities of the individual. In another embodiment, further information is provided about the individual and the user of the computer-implemented method is prompted to ask the individual questions. For instance, information on the individual's college, home town, or family may be available. The user may ask if the individual went to the college to determine if the identification is correct. Other like authentication procedures are envisioned.

In block 545, if the computer-implemented method 500 determines the identity of the individual within the desired confidence level then the user's identity is authenticated. In an embodiment, authentication means that the computer-implemented method has confirmed the identity of the individual in the real-time video stream with sufficient certainty to conduct transactions based on the identification. Authentication confirms to the user, the financial institution, and in some cases the identified individual that the individuals involved in the transaction are properly identified.

In an embodiment, the user is authenticating the user's own identity. In this embodiment, the computer-implemented method allows the mobile device to act as a proxy for a password. In some embodiments, the user desires to conduct a transaction using the mobile device. For example, the user may wish to purchase something using a mobile wallet application on the mobile device. The mobile device is capable of transferring information related to the transaction to the payee but the identity of the payor, i.e., the user of the mobile device, is authenticated first. The user can capture an image of his face in a real-time video stream recorded by the device and authorize the transaction based on identification and authentication of his identity. As discussed herein, the computer-implemented method compares his image in the real-time video stream to a reference image available to the method and confirms the user's identity. It should be understood that authenticating the user's identity is not only possible for transactions between individuals or between an individual and a business. For example, the user may authenticate his identity at an ATM or bank counter and then conduct a transaction through the mobile device.

In another embodiment, the user authenticates his identity using the computer-implemented method but conducts the transaction through a secondary channel. In this embodiment, the user authenticates his identity using the mobile device but the transaction occurs through other channels, such as internet portals, standard payment procedures in stores, or in person transactions. For example, a user may be conducting an internet transaction wherein the user attempts to purchase an item from a website. The transaction is conducted through the website but when the user attempts to pay, rather than entering payment information into a form on the website, the user records an image of the user's own face in the user's mobile device. The mobile device then communicates with the network to authenticate the user's identity and approve the transaction. In an embodiment, the mobile device wirelessly connects to the website and conducts the transaction. In another embodiment, the user enters payment information into the website but the website requires approval from the financial institution before processing the transaction. In this embodiment, the mobile device communicates with the financial institution server to approve the transaction once the user is authenticated.

In a still further embodiment, the user identifies another individual in the real-time video stream. For example, the user may identify a merchant, a friend, a business partner, etc., using the computer-implemented method described herein. In one embodiment, the individual is known to the user but in another embodiment the user and the individual are unknown to one another. Even if the user and the individual are unknown to one another, the computer-implemented method 500 is capable of identifying the individual using publicly or privately available information. For example, the mobile device may determine the location of the user when analyzing the real-time video stream, e.g., by using a built-in GPS or by identifying a landmark in the video, and then search for images of individuals associated with that location.

In an embodiment, merchants such as small business owners make reference images of themselves and their employees available in a financial institution database. If a customer of the merchant desires to conduct a transaction, the customer can use the computer-implemented method 500 to identify the merchant, confirm the merchant's identity, and conduct the transaction with the merchant. For example, a user may want to purchase an item at a store. The user brings the item to an employee working in the store and captures an image of the employee on the user's mobile device. The computer-implemented method 500 confirms the identity of the employee and authenticates that the employee is authorized to sell the item, based on the reference images made available by the merchant. If the employee is authenticated, the computer-implemented method 500 conducts the transaction, as will be discussed in greater detail in blocks 545 and 575.

In block 535, however, the individual is not identified within the confidence level and thus in some embodiments the computer-implemented method 500 prompts the user to identify the individual. For example, the method may prompt the user to enter information into the mobile device. It should be understood that the computer-implemented method can prompt the user to identify the individual in many different ways. The method may send the user a text message, an email, or a phone call. The method may provide an indicator on the display asking the user to enter the individual's name or identifying information into the mobile device. Other means for prompting an individual through the mobile device are possible.

In block 540, the user identifies the individual in the real-time video stream. The user may confirm the highest-probability individual presented to the user or select an individual from a list of possible individuals presented in the real-time video stream. The user may enter the individual's name in the mobile device, select the individual from a variety of individuals suggested by the mobile device, indicate avenues to pursue in investigating the individual, or other means of providing said input to the computer-implemented method. For example, the user may not know an individual captured in a real-time video screen but may be aware that the individual is an employee of a specific company. The user may provide that information in response to the prompt and then the computer-implemented method will search for reference images related to that company for assistance in identifying the individual. In some embodiments, the mobile device continues to prompt the user for identifying information, such as location, business, first or last name, age, or other identifying characteristics, until the individual is identified with the desired confidence level or the user cancels the attempt at identification.

Turning to block 550, once an individual is authenticated, the computer-implemented method 500 sends the authentication to the financial institution server. In an embodiment, the transaction is conducted with no further action on the part of the user. Instead, the financial institution server determines that the user's identity is authenticated and completes the transaction. In some embodiments, the merchant sends a transfer request to the financial institution server and the transfer request, e.g., a purchase, is approved once the individual's identity is authenticated. Thus, in block 555 the transaction is completed based on identification of the individual in the augmented reality environment.

In some embodiments, however, the computer-implemented method 500 presents an indicator to the user, as represented in block 560. As discussed, the indicator may relate to the user, to the individual, or to the financial transaction. In some embodiments, the indicator relates to the financial status of the user. For example, the indicator may display the balance in the user's account or the remaining balance in the user's account if the transaction is conducted. In another embodiment, the indicator relates to a budget that the user has established with the bank and the status of the budget based on the transaction. In still further embodiments, the indicator depicts the number of transactions that the user has conducted with the identified individual or the number of transaction that the user has conducted in a category of transactions similar to the individual. For example, a user may capture an image of the user's babysitter in a real-time video stream in order to pay the babysitter. The user also sees superimposed on the image of the babysitter a history of previous payments made to the babysitter. In another embodiment, the indicator relates to the individual being identified. For example, the indicator may display information relating to the merchant, such as sales, discounts, or the like. In a still further embodiment, the indicator relates to the financial transaction. For example, the indicator may convert the transaction from one currency to another currency so that the user may better understand the terms of the transaction.

In an embodiment, the indicator presented in the real-time video stream provides more than just information. In some embodiments, the indicator allows the user to provide input on how to conduct the financial transaction, such as selecting an account for the transaction, making a purchase, making a return, making a sale, making a loan, making a gift, making a charitable contribution, depositing money in an account, transferring funds, etc.

In some embodiments, the indicator allows the user to select an account to use for the transaction. For example, names or categories of accounts may be displayed in the real-time video stream, e.g., a credit card icon, a checking account icon, and a gift card icon may be displayed over an employee at a store and allow the user to pay for a purchase from the employee using each of the accounts. The user would select the account from which the funds are being debited and then the transaction would be completed in accordance with the user's instructions.

In some embodiments, the indicator allows a user to make a transfer of funds after identifying an individual in the real-time video stream. The transfer may be a purchase, a sale, a loan, or another type of transaction where funds are transferred by the user. For example, a "purchase now" icon or other depiction that indicates the user desires to conduct a purchase can be displayed on the real-time video stream. Given the variety of actions that can be taken in response to a transaction, innumerable commands can be displayed as indicators in association with an identified individual. It should be understood that commands such as "sell," "donate," "loan," "borrow," or other financial transaction commands can be displayed in the real-time video stream and facilitate transactions with identified individuals.

Furthermore, in some instances, an object may include one or more markers identified by the object recognition application 225 that leads the object recognition application 225 to associate an object with more than one objects in the data storage. In such instances, the user may be presented with multiple candidate identifications and may opt to choose the appropriate identification or input a different identification. The multiple candidates may be presented to the user by any means. For instance, in one embodiment, the candidates are presented to the user as a list wherein the "strongest" candidate is listed first based on reliability of the identification. Upon input by the user identifying the object, the object recognition application 225 may "learn" from the input and store additional markers in order to avoid multiple identification candidates for the same object in future identifications.

Additionally, the object recognition application 225 may utilize other metrics for identification than identification algorithms. For instance, the object recognition application 225 may utilize the user's location, time of day, season, weather, speed of location changes (e.g., walking versus traveling), "busyness" (e.g., how many objects are in motion versus stationary in the video stream), as well any number of other conceivable factors in determining the identification of objects. Moreover, the user may input preferences or other metrics for which the object recognition application 225 may utilize to narrow results of identified objects.

In some embodiments, the AR presentation application 221 may have the ability to gather and report user interactions with displayed indicators. The data elements gathered and reported may include, but are not limited to, number of offer impressions; time spent "viewing" an offer, product, object or business; number of offers investigated via a selection; number of offers loaded to an electronic wallet and the like. Such user interactions may be reported to any type of entity desired. In one particular embodiment, the user interactions may be reported to a financial institution and the information reported may include customer financial behavior, purchase power/transaction history, and the like.

In various embodiments, information associated with or related to one or more objects that is retrieved for presentation to a user via the mobile device may be permanently or semi-permanently associated with the object. In other words, the object may be "tagged" with the information. In some embodiments, a location pointer is associated with an object after information is retrieved regarding the object. In this regard, subsequent mobile devices capturing the object for recognition may retrieve the associated information, tags and/or pointers in order to more quickly retrieve information regarding the object. In some embodiments, the mobile device provides the user an opportunity to post messages, links to information or the like and associate such postings with the object. Subsequent users may then be presenting such postings when their mobile devices capture and recognize an object. In some embodiments, the information gathered through the recognition and information retrieval process may be posted by the user in association with the object. Such tags and/or postings may be stored in a predetermined memory and/or database for ease of searching and retrieval.

Turning now to block 565, the user provides input in response to the indicator. As discussed the user may provide input to the method in a variety of manners. For example, the user may select an indicator using a touch-sensitive display. Optionally, the user may use a keyboard or other input device to provide input. In some embodiments, the method is capable of receiving voice commands when the user speaks into a receiver on the mobile device. It should be understood that generic commands, such as "cancel" or "stop," are also possible.

In block 570, the computer-implemented method 500 receives input from the user. The method may analyze the input using the processor and determine the appropriate response. For example, if the user selects the "purchase" indicator associated with the authenticated individual the computer-implemented method 500 will approve a pending transaction from that individual through the financial institution's server, as depicted in blocks 575 and 550, so that the transaction can be completed.

In block 575, the computer-implemented method 500 conducts the financial transaction according to the user input. The method may approve a purchase of a product or approve the transfer of funds as part of a gift or charitable donation. In some embodiments, the method sends this approval to the financial institution server, which thereafter authorizes the transaction.

It should be understood that every step does not need to occur in the order described herein, or even need to occur at all. Different steps in the computer-implemented method can be skipped or moved around and still accomplish the goal of conducting financial transactions based on identification of individuals. For example, the method can display indicators next to individuals before identifying the individuals. In this example, the indicator may relate to the user of the financial transaction, such as the balance in the user's checking account that will be used for any purchases. The steps disclosed herein are not limiting to the exact order discussed.

Turning now to FIG. 6, a screenshot 600 of a real-time video stream depicting identified individuals and indicators associated with those individuals is provided in accordance with an embodiment of the invention. In the screenshot 600, an individual 610 is depicted surrounded by indicators 620, 630, 640, 650, 660. At this stage in the computer-implemented method 500, the individual 610 has been identified and authenticated based on comparison to a reference image. In some embodiments, information pertaining to the individual is presented. For example, the name of the individual's employer 620 may be presented to the user. In further embodiments, the user is able to select an account from which the transaction will occur. For example, the user may select from a checking account 630 or a credit card 640. This allows the user to select the account in which the transaction, whether it is a purchase, a deposit, or a transfer, etc., will occur. In a still further embodiment, indicators providing actions relating to the financial transaction may also be presented. For example, once the individual is authenticated the user may have the option to purchase 650 something from the individual 610 or the individual's employer 620. In another example, the user may have the option to make a charitable donation to the individual 610 or the individual's employer 620. In one embodiment, the user interacts with the indicators by selecting them on a touchscreen, scroll-wheel 680, or other interactive device.

The systems, methods, computer program products, etc. described herein, may be utilized or combined with any other suitable AR-related application. Non-limiting examples of other suitable AR-related applications include those described in the following U.S. Provisional Patent Applications, the entirety of each of which is incorporated herein by reference:

| U.S. Provisional Ser. No. | Filed On | Title |
| --- | --- | --- |
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for conducting a financial transaction based on identification of an individual in an augmented reality environment, the method comprising:
    analyzing, via a computing device processor, a video stream received via a mobile device;
    identifying an individual in the video stream within a predetermined confidence level based on a comparison of a real-time image from the video stream to a reference image;
    presenting an indicator associated with a financial transaction in the video stream;
    receiving an input associated with the indicator from a user of the mobile device; and
    conducting the financial transaction between the individual and the user of the mobile device based on identification of the individual and in response to the input.

2. The computer-implemented method of claim 1, wherein identifying the individual comprises:
    capturing an image of the individual in the video stream; and
    comparing the image to said reference image.

3. The computer-implemented method of claim 1, wherein the indicator is further associated with the individual.

4. The computer-implemented method of claim 1, wherein the indicator is further associated with said user of the mobile device.

5. The computer-implemented method of claim 1, wherein the financial transaction is selected from the group consisting of a purchase, a refund, a loan, a payment, and a surety.

6. An apparatus for conducting a financial transaction based on identification of individuals, the apparatus comprising:
    a computing platform having a processor, a memory in communication with the processor, and
        image capture logic stored in the memory, executable by the processor and configured to capture a video stream, and
        identification logic stored in the memory, executable by the processor and configured to identify which images in the video stream captured by a mobile device correspond to an individual, and
        image comparison logic stored in the memory, executable by the processor and configured to identify the individual based on comparison to a reference image within a predetermined confidence level;
        presentation logic stored in the memory, executable by the processor and configured to present an indicator association with a financial transaction in the video stream;
        input logic stored in the memory, executable by the processor, and configured to receive input associated with the indicator from a user of the mobile device; and
        transaction completion logic stored in the memory, executable by the processor and configured to conduct the transaction in response to the input and if the individual is identified based on the comparison to the reference image.

7. The apparatus of claim 6, further comprising presentation logic stored in the memory, executable by the processor and configured to present, on a display of the mobile communication device, one or more indicators, each indicator presented in a live video stream proximate a location of the identified individual.

8. The apparatus of claim 6, further comprising a positioning system device, wherein the individual is identified based at least in part on a location of the individual determined by the positioning system device.

9. The apparatus of claim 6, further comprising a networking device, wherein the reference image is received via the networking device.

10. The apparatus of claim 6, further comprising a microphone, wherein the individual is identified at least in part on an audio recording of the user.

11. The apparatus of claim 6, further comprising an input device, wherein the user conducts the transaction by actuating the input device.

12. The apparatus of claim 11, wherein the input device is a touch sensitive pad.

13. The apparatus of claim 6, wherein the reference image is stored in the memory.

14. The apparatus of claim 6, wherein the video stream is captured by a video camera.

15. The apparatus of claim 6, wherein the video stream is captured over a networking device and stored in the memory.

16. A computer program product, comprising a non-transitory computer-readable medium comprising computer-executable instructions for conducting financial transactions based on identification of individuals, the instructions comprising:
    instructions for identifying which images in a video stream captured on a mobile device correspond to an individual;
    instructions for determining which of one or more individuals in the video stream are identified based on comparison with a reference image within a predetermined confidence level;
    instructions for presenting an indicator associated with a financial transaction in the video stream;
    instructions for receiving an input associated with the financial transaction from a user of the mobile device; and
    instructions for conducting the financial transaction based on identification of the individual in the real-time video stream and in response to the input.

17. The computer program product of claim 16, further comprising instructions for presenting information related to the individual.

18. The computer program product of claim 17, wherein in the information is presented real-time on the video stream.

19. The computer program product of claim 18, where the information is financial information of a user.

20. The computer program product of claim 19, wherein the financial information is at least one financial transaction between the user and the individual identified in the video stream.

21. The computer program product of claim 16, wherein the input is received from a touch sensitive screen.

22. The computer program product of claim 16, further comprising instructions for receiving information for a social networking site, wherein the individuals are identified based on comparison to the reference image from the social networking site.

* * * * *